United States Patent [19]
Eyerly et al.

[11] Patent Number: 5,708,336
[45] Date of Patent: Jan. 13, 1998

[54] THERMAL CONTROL SYSTEM FOR A MOTOR

[75] Inventors: Bruce N. Eyerly, Torrance, Calif.; Peter L. Conley, Sedona, Ariz.

[73] Assignee: Hughes Electronics, Los Angeles, Calif.

[21] Appl. No.: 701,468

[22] Filed: Aug. 21, 1996

[51] Int. Cl.⁶ .............................. H02H 7/08; H02P 7/00
[52] U.S. Cl. ........................................ 318/436; 318/471
[58] Field of Search ........................ 318/40, 436, 471

[56] References Cited

U.S. PATENT DOCUMENTS

| | | |
|---|---|---|
| 3,445,743 | 5/1969 | Blair. |
| 3,582,712 | 6/1971 | Blair. |
| 3,717,804 | 2/1973 | Dikinis et al.. |
| 3,774,096 | 11/1973 | Hann ........................... 318/436 |
| 4,135,122 | 1/1979 | Holmquist et al. ................ 318/436 |
| 4,195,324 | 3/1980 | Waltz ............................ 318/436 X |
| 4,355,269 | 10/1982 | Burton et al. ................... 318/436 |
| 4,638,643 | 1/1987 | Sakazume et al. ............... 318/436 X |
| 4,808,896 | 2/1989 | Katsuragi et al. ................ 318/436 |

Primary Examiner—Bentsu Ro
Attorney, Agent, or Firm—Terje Gudmestad; Wanda K. Denson-Low

[57] ABSTRACT

The present invention is a temperature control system for a motor coupled to a power source. The motor has at least one winding which serves as a heater and temperature sensor as well as producing torque during normal operation. The mathematical relationship between temperature and resistance in the motor winding is used to determine the winding temperature. The actual winding temperature is then compared to a desired operating temperature, and the current to the motor winding is controlled so as to keep the motor temperature within a desired range.

14 Claims, 4 Drawing Sheets

5,708,336

THERMAL CONTROL SYSTEM FOR A MOTOR

BACKGROUND OF THE INVENTION

1. Field of the Invention

This invention relates to a temperature control system for a motor. More specifically, the invention uses at least one motor winding as the heater and temperature sensor of the temperature control system.

2. Description of the Related Art

Stepper motor driven actuators use a motor control circuit to control motor operation during normal use. An example is shown in FIG. 1 and described in "Stepping Motors and their Microprocessor Controls" by Takashi Kenjo, (Clarendon Press), (1985), (pp. 132, 142).

The motor control circuit has a voltage source 18 connected through switches 22 and 22' to a motor 19. The motor has a winding 20, consisting of a resistive component 20a, an inductive component 20b and a source of electromotive force 20c which is proportional to motor speed. For descriptive purposes only motor winding 20 is described hereafter. Motor winding 20' is identical and the motor could have additional windings. A resistor 24 is connected in series with the motor winding 20. The voltage drop across resistor 24 is proportional to the motor current, and is sensed by a voltage sensing device 26, which provides an output to a voltage comparator 28. A reference voltage 30 is also provided to comparator 28 to set the level of current desired. The current through the motor is compared to the selected reference current. Voltage comparator 28 provides a control signal to switch controller 32 to control switches 22, 22'. Switches 22, 22' are alternately opened and closed. Controller 32 opens and closes switches 22, 22' at a high rate of speed to effectively reduce the voltage applied to motor 19 below that of voltage source 18. Controller 32 adjusts the percentage of time that the switch is open versus closed until the desired current, as determined by resistor 24, and voltage sensing device 26, is achieved.

Stepper motor driven actuators often need a thermal control system to keep the operating temperature within acceptable limits. This is especially true of actuators used in space borne systems where temperatures may drop below −100° C. Therefore, a thermal control system is used in conjunction with the motor control circuit.

FIG. 2 illustrates a prior thermal control circuit using a temperature control circuit and a heater element in the proximity of a motor but operating independently of it. This circuit is well known in the art and described in chapter 4 of "Satellite Thermal Control Handbook" by David G. Gilmore, (The Aerospace Corporation Press), (1994),(pp. 4–91, 4–92).

FIG. 2 shows a stepper motor 2, in phantom. A power source 4 is connected to a heater element 6 by a heater switch 8. A temperature sensing resistor, or thermistor 10, is connected to a constant current source 12. The electrical resistance of the thermistor 10 varies with temperature. A voltage sensing device 14 is connected in parallel with the current source 12 and provides an input for a controller 16 which controls the state of the heater switch 8. This system uses a heating element and a temperature sensor which are independent of the motor.

The circuit in FIG. 2 operates as follows. A constant current from current source 12 is supplied to the thermistor 10. The voltage sensing device 14 measures the voltage needed to supply the constant current to the thermistor load.

Thus, knowing the voltage across the thermistor and the current through the thermistor, by Ohm's Law the resistance and hence temperature of the thermistor 10 can be determined. If the thermistor 10 is physically attached to a structural element, for example, stepper motor 2, the temperature of that element will be the same as the thermistor and will be related to the output of the voltage sensing device 14. The thermal control system operates independently of the motor.

If the output of the voltage sensing device 14 falls below a predetermined threshold, or exceeds a threshold in the case of a negative temperature coefficient thermistor, the controller 16 closes the heater switch 8. This allows power from the power source 4 to be dissipated by the heater element 6, which is typically attached to the same structural element as thermistor 10 and motor 2. As the heater element 6 supplies heat to the structure, the thermistor resistance changes. If the structure has warmed sufficiently to allow the output of the voltage sensing device 14 to exceed a predetermined threshold, the controller opens the heater switch 8. In this way the system is held within a desired temperature range.

The described temperature control system adds considerable hardware to the overall motor system, such as the heater controller, temperature sensors and associated wire harnessing thus adding to both the system cost and complexity. It would be desirable to have a temperature control mechanism that did not require so much additional hardware.

SUMMARY OF THE INVENTION

The present invention is a thermal control system for a motor which reduces hardware by using a motor winding as the heater element and temperature sensor. The winding serves both as a heater at times and to produce torque at times. In one embodiment using a stepper motor, the thermal control system operates when the motor is inactive and not producing torque. The winding temperature is derived from the winding resistance through the known relationship (i.e. transfer function) between winding temperature and resistance. The temperature of the winding is then compared to a reference temperature, usually the desired operating temperature. A difference or comparison signal is computed and provided to a switch controller which sends a signal to a switch to couple a power source to the winding. If the compared temperatures indicate that the motor is too cold, the switch connects the power source to the winding to increase the current through the winding and thus raise the winding temperature.

An alternative embodiment senses the winding temperature with a separate temperature sensor. The sensed temperature and a reference temperature are compared and a control signal sent to a switch controller to produce a signal which controls the winding current and hence temperature.

A second alternative embodiment uses a torque motor which produces a continuous torque as long as current is applied. However, during periods where the motor is not operating at full power, additional heat may be produced. Torque currents are applied along with other heating currents whose phase is in quadrature or 90 degrees out of phase with the torque producing currents resulting in zero additional torque being produced by the motor.

DETAILED DESCRIPTION OF THE INVENTION

Figure 3:
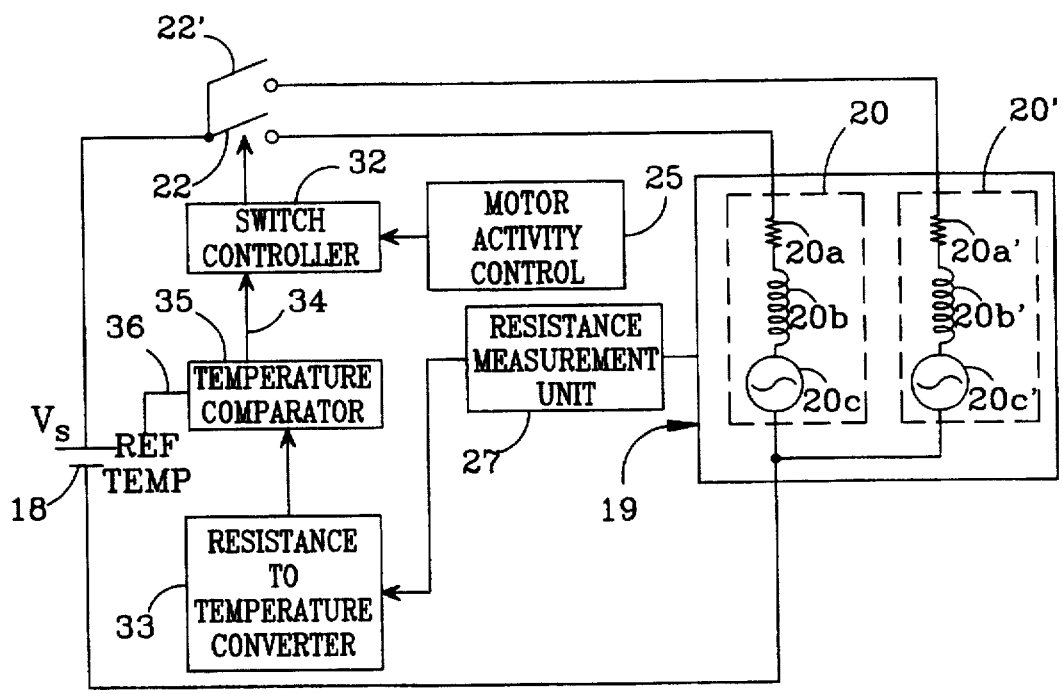
FIG. 3 is a functional level schematic diagram of the thermal control system for the motor of the present invention.

FIG. 3 shows an implementation of the present invention in which a stepper motor winding is used as a temperature sensor and heating element of a thermal control system to control motor temperature, as well as to provide torque. In FIG. 3 elements similar to those in FIG. 1 are numbered the same.

To start normal operation of motor 19, motor activity control 25 provides a signal to switch controller 32 to cause switches 22, 22' to provide current to motor windings 20, 20'. Motor activity control 25 provides an interface for control signals from any standard motor control circuit to switches 22, 22'. To stop motor operation, motor activity control 25 provides a different signal to switch controller 32 to open switches 22, 22'. This also initiates acceptance of signals from the thermal control circuitry. The switch controller will monitor which motor winding 20 or 20' was the last winding deactivated as motor 19 was deactivated. This winding is selected for connection by switch 22 or 22' to voltage source 18 to provide heat. Since it was the last motor winding deactivated it will not cause the motor to step when power is reconnected.

A resistance measurement unit 27 provides a measure of the resistance through motor winding 20. This resistance is provided to a resistance to temperature converter 33 which finds the proportionality relationship (i.e. transfer function) between the temperature and resistance of motor winding 20. That proportionality means that if the resistance of motor winding 20 is known then the temperature is known. Resistance to temperature converter 33 may be implemented by a microprocessor which stores values of the relationship. A signal that corresponds to the motor temperature from resistance to temperature converter 33 is provided to temperature comparator 35 which also receives a reference temperature input 36. A comparison is made between the temperatures to see if motor winding 20 needs to be activated to maintain the temperature of the winding within a specified range around the temperature of input 36. Temperature comparator 35 provides a control signal 34 to switch controller 32 to operate switch 22 to control the current level and heat in motor winding 20, as described in connection with FIG. 1.

Figure 1:
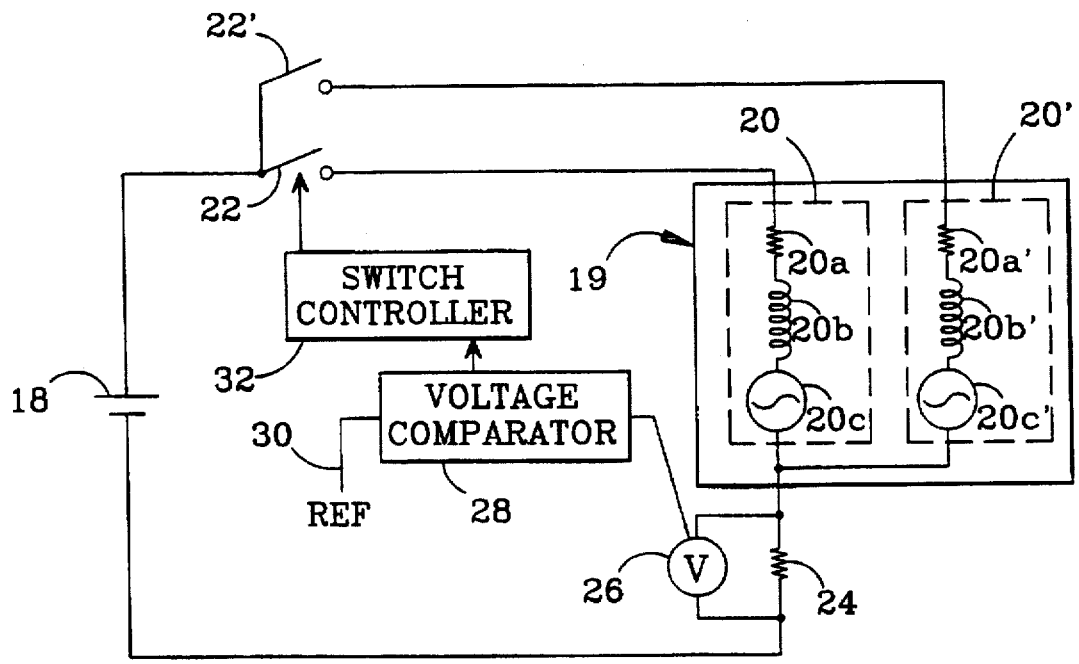
FIG. 1 is a functional level schematic diagram of the prior motor control system, described above.
Figure 2:
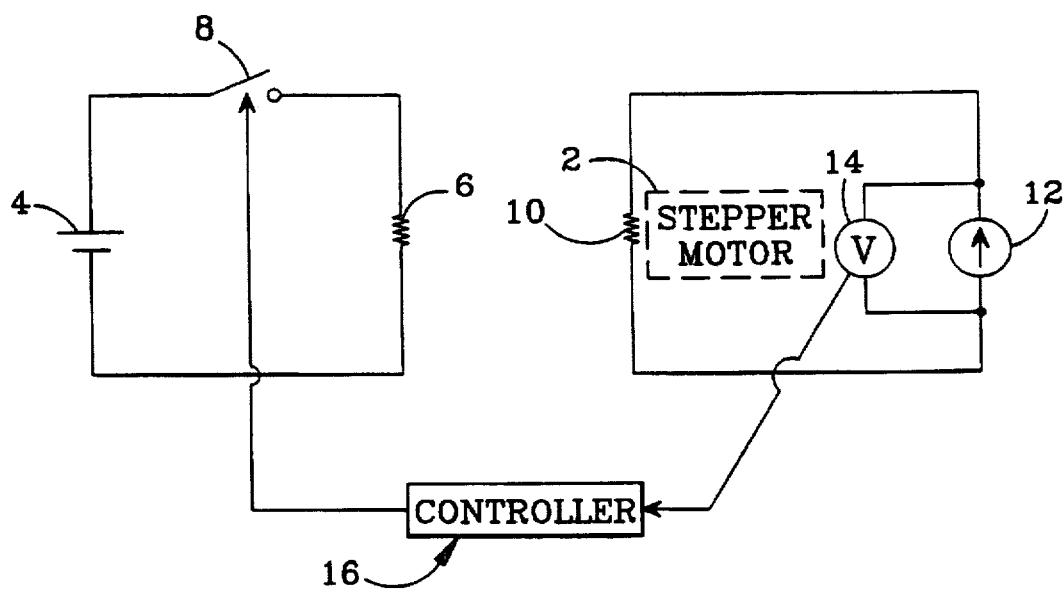
FIG. 2 is a schematic diagram of the prior thermal control system, described above.
Figure 4:
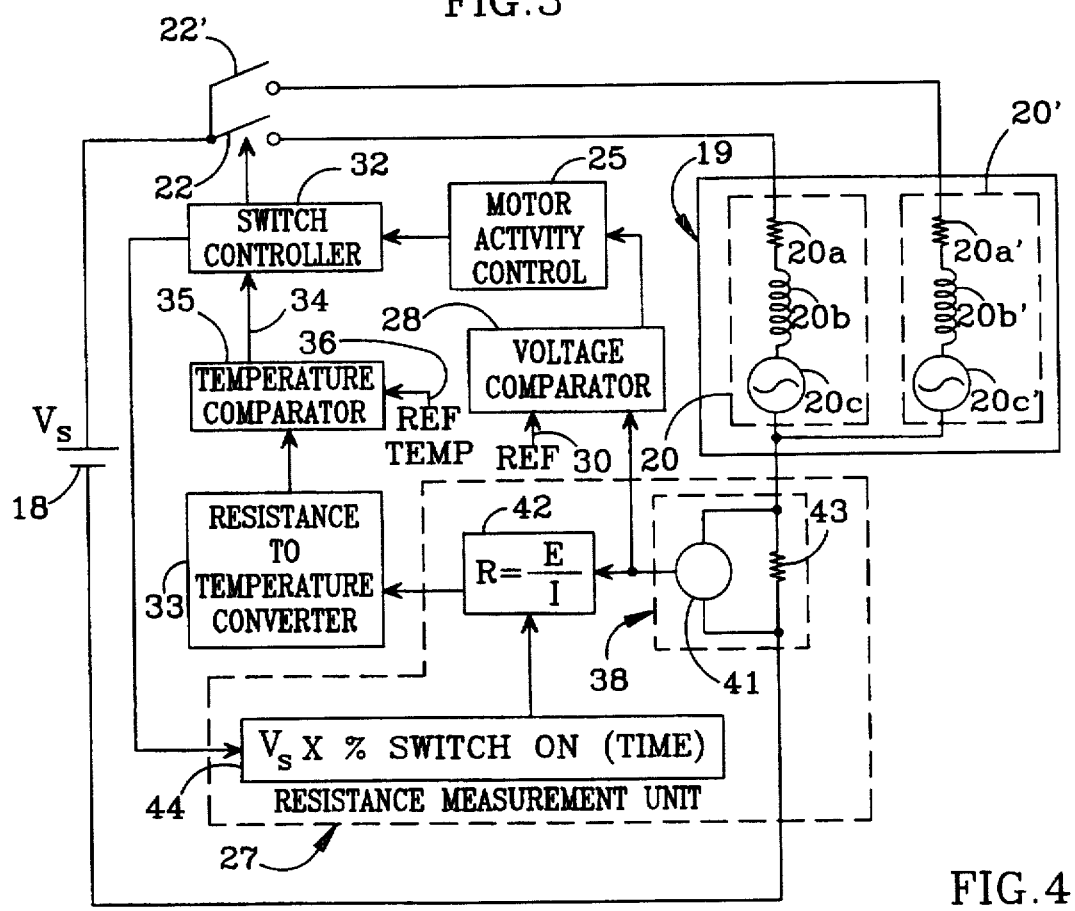
FIG. 4 is a more detailed schematic diagram of the thermal control system of FIG. 3.

FIG. 4 is a more detailed illustration of the system shown in FIG. 3, additionally incorporating the motor control system of FIG. 1. Resistance measurement unit 27 has a current sensor 38 which includes a voltage sensing device 41, such as a voltmeter, which measures a voltage across a resistor 43 that is a measure of the current through motor winding 20. Other current sensors such as an inductive pick-up could be used. The output of voltage sensing device 41 is provided to voltage comparator 28 in the motor control circuitry.

During normal operation of the motor, voltage comparator 28 and reference 30 are active and provide a signal to motor activity control 25 to activate the motor. When comparator 28 and reference 30 provide signals to deactivate the motor to motor activity control 25 and switch controller 32 this initiates acceptance of signals from the thermal control circuitry.

Voltage sensing device 41 provides an output to motor winding resistance calculator 42. An effective voltage calculator 44 receives an input from switch controller 32 which provides the percentage of on time for switch 22 as described in FIG. 1. This percentage is multiplied by the power source voltage 18 to compute the effective voltage across motor winding 20. The effective voltage is then provided to motor winding resistance calculator 42 which divides the input from current sensor 38 into the input from effective voltage calculator 44 to compute the motor winding resistance 20a.

Figure 5:
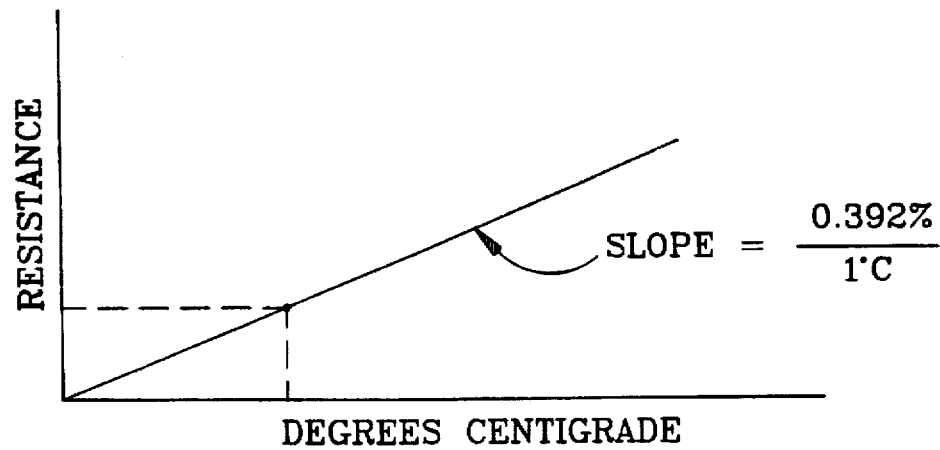
FIG. 5 is a graph showing the relationship between resistance and temperature of a motor winding.

This resistance figure is then provided to resistance to temperature converter 33 which finds the proportionality relationship (i.e. transfer function) between temperature and motor winding resistance. A microprocessor may be used to perform the functions of resistance measurement unit 27, resistance-to-temperature converter 33 and temperature comparator A typical transfer function between the resistance and temperature of motor winding 20 is shown in FIG. 5. The temperature sensitive nature of the resistance element 20a is a well known phenomenon of metals. Most motor windings are made of copper which has a temperature coefficient of 0.00392/deg. C. Thus, for every 1 degree C. rise in temperature, the resistance of the winding increases by 0.392%. Regulation of temperature within ±10 degrees of the desired temperature would be more than adequate for most applications. This variation would result in a ±4% change in resistance, which would be detectable by many motor circuits presently in use. Temperatures in space applications may drop below −100° C. The invention will allow motor temperatures to be increased to a typical value of 0° C.

During periods of motor inactivity, motor power is off and velocity is 0. If the resistance and hence temperature as computed in the resistance to temperature converter 33 is below a predetermined lower threshold this indicates the motor is too cold. Temperature comparator 35 provides a signal to switch controller 32 to activate switch 22 to provide current to motor winding 20. Resistance measurement unit 27 detects resistance changes in motor winding 20 due to heating and sends a signal to resistance to temperature converter 33 which converts the resistance to a temperature. Switch 22 continues to energize the motor winding until temperature comparator 35 indicates that the temperature has risen above a predetermined upper threshold. Conversely, if the measured resistance and temperature is already above the lower threshold the switch 22 simply de-energizes the winding 20.

Figure 6:
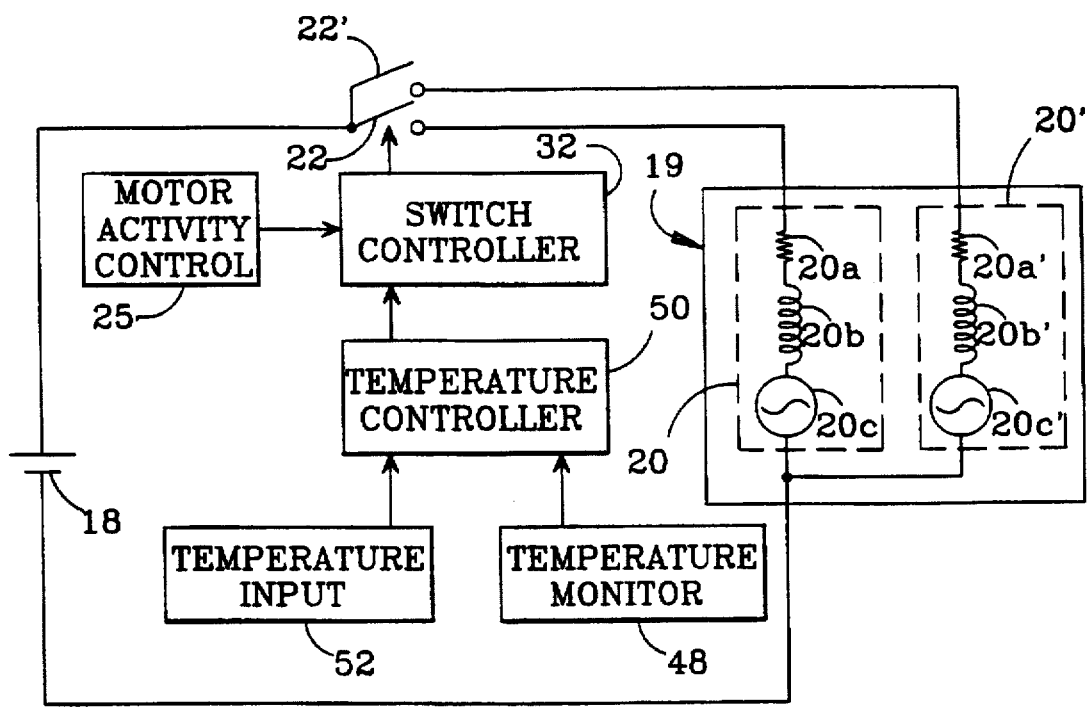
FIG. 6 is a functional level schematic diagram of an alternative embodiment of the invention.

Another embodiment of the invention in which the motor winding acts as a heater is shown in FIG. 6. This embodiment has a conventional temperature monitor 48 which senses the motor temperature and passes a temperature signal to a temperature controller 50. A desired temperature input 52 is also provided to temperature controller 50. If the temperature input from temperature monitor 48 is above the desired temperature input 52, the motor temperature controller 50 provides a signal to switch controller 32 which operates the motor in its normal manner, namely, to de-energize the motor winding 20 after the motor stops. If the temperature input from temperature monitor 48 is below the desired temperature input 52, the switch controller 32 continuously energizes motor winding 20. Motor activity control 25 provides an interface for control signals from any standard motor control to switches 22, 22'.

Advantages of this technique include higher accuracy of determining the actual temperature and the ability to deduce this temperature while the motor is turning and the electromotive force 20C is non-zero. However, the disadvantage is the retention of the thermal measurement hardware.

Lastly, this invention can be applied to torque motors. Unlike stepper motors, torque motors produce torque as long as currents are applied to the windings and as long as those currents have the proper phasing relationship given the instantaneous motor position. Such techniques are well known and prior art is well established.

However, according to the invention, during periods where the motor is not operating at full power, additional heat may be produced. Torque currents are applied along with other heating currents whose phase is in quadrature or 90 degrees out of phase with the torque producing currents resulting in zero additional torque being produced by the motor. Thus, by superimposing quadrature currents for the purpose of motor heating with the in-phase currents for the purpose of torque generation, the basic principles of this invention can be applied to torque motors.

Figure 7:
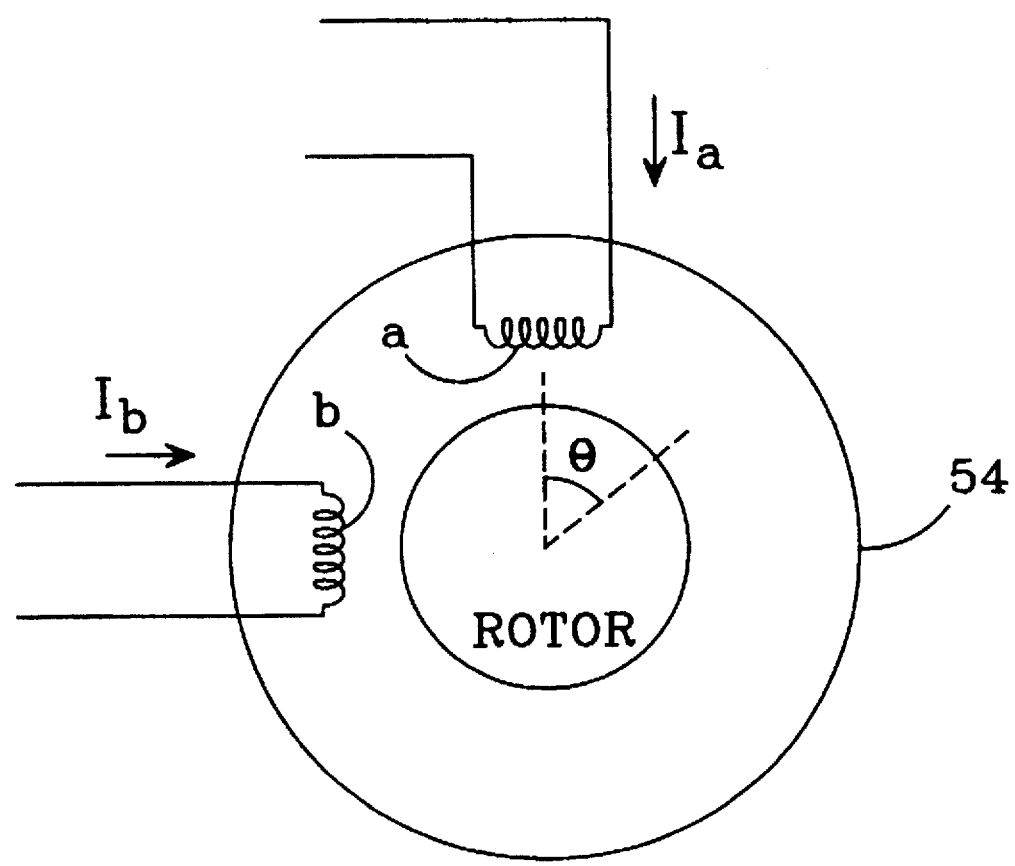
FIG. 7 is a functional level schematic diagram of a third embodiment of the invention.

FIG. 7 shows a two-phase torque motor 54 with two windings a and b which, during normal operation, produce torques Ta and Tb having the equations:

$$Ta = IaKt\sin\theta \quad Tb = IbKt\cos\theta$$

where $\theta$ is the rotor angle

Kt is the motor "torque constant"

Ia and Ib are the motor winding currents

Ia=Tcmd$\sin\theta$/Kt

Ib=Tcmd$\cos\theta$/Kt

Tcmd is the desired motor torque. Ta+Tb is the composite torque term for normal operation:

$$Ta+Tb=Tcmd(\sin^2\theta+\cos^2\theta)=Tcmd$$

In this invention, an additional current, 90° out of phase from the normal current, is introduced to each motor winding.

Ia=Tcmd$\sin\theta$/Kt+X$\cos\theta$

Ib=Tcmd$\cos\theta$/Kt+(−X$\sin\theta$)

The composite torque value with the added currents is:

$$\begin{aligned}Ta+Tb &= Tcmd+[(X\cos\theta)(Kt\sin\theta)+(-X\sin\theta)(Kt\cos\theta)]\\ &= Tcmd+XKT[(\cos\theta\sin\theta)-(\sin\theta\cos\theta)]\\ &= Tcmd\end{aligned}$$

The additional currents (X $\cos\theta$ and −X $\sin\theta$) combine with the torque producing currents to yield zero additional torque. However, they introduce a motor heating effect due to the $I^2R$ resistive losses in the motor windings. Hence, motor heating can be produced by introducing these additional currents into the motor windings independent of the currents used to generate torque.

While several embodiments of the invention have been shown and described, numerous variations and alternative embodiments will occur to those skilled in the art. Accordingly, it is intended that the invention be limited only in terms of the appended claims.

We claim:

1. A motor temperature control system comprising:

a motor having at least one winding, a resistance measurement unit which determines the resistance of said at least one winding, a resistance to temperature converter which converts said resistance to a signal representing an equivalent winding temperature, a temperature comparator which compares said equivalent winding temperature signal to a signal representing a reference temperature to produce a control signal representing the difference between said equivalent winding and reference temperatures, and at least one switch having one terminal connected to provide power to said motor and an opposed terminal connectable to a power source, said at least one switch responding to said control signal to control the power provided to said at least one winding and thereby control the amount of heat produced by said at least one winding.

2. A motor temperature control system comprising:

a motor having at least one winding, a resistance measurement unit including a current sensor for providing an indication of the current in said at least one winding as an output, said resistance measurement unit computing the effective voltage across said at least one winding, said resistance measurement unit further computing the resistance across said one winding from said current sensor output and said effective voltage, a resistance to temperature converter which determines the temperature of said at least one winding from said winding resistance, a temperature comparator which compares said winding temperature with a predetermined reference temperature to produce a control signal, and at least one switch coupled to said at least one winding and connectable to a power source, said at least one switch responding to said control signal to control the power provided to said at least one winding and thereby control the amount of heat produced by said at least one winding.

3. The motor temperature control system of claim 2, wherein said current sensor includes a voltage sensing device connected to provide an indication of the current through said at least one winding.

4. The motor temperature control system of claim 3, wherein said current sensor includes a resistor connected in series with said at least one winding, with said voltage sensing device sensing the voltage across said resistor.

5. The motor temperature control system of claim 2, wherein said resistance measurement unit includes an effective voltage calculator which computes said effective voltage as a function of the voltage of a power source used to energize the motor and the percentage of time said switch is active.

6. The motor temperature control system of claim 2, wherein said resistance measurement unit includes a resistance calculator which receives said computed effective voltage and said current indication and computes said resistance as the ratio of said effective voltage to said current indication.

7. The motor temperature control system of claim 2, wherein said resistance to temperature converter uses the temperature-to-resistance transfer function of said at least one winding to compute the temperature of said winding from its resistance.

8. The motor temperature control system of claim 2, wherein said temperature comparator compares said winding temperature with said predetermined reference temperature to produce a comparison signal which represents the difference between the two temperatures, and produces said control signal from said comparison signal.

9. The motor temperature control system of claim 8, wherein said control signal is coupled to said at least one switch to control a heating current through said at least one winding.

10. The motor temperature control system of claim 9, further comprising a switch controller receiving said control signal to control the opening and closing of said at least one switch.

11. The motor temperature control system of claim 10, further comprising a motor activity control providing a signal to said switch controller indicating when said motor is active to produce torque and when said motor is inactive.

12. A temperature control for a motor which is intended to receive torque producing motor currents from an energizing power source, comprising:

a temperature monitor for sensing the temperature of said motor and providing an indicator of said temperature as an output, a temperature controller coupled to said temperature monitor to receive said temperature indicator, said temperature controller comparing said temperature indicator with a temperature reference to provide a comparison signal and producing a control signal from said comparison signal, at least one switch coupled to at least one winding of said motor and connectable to said power source, said at least one switch receiving said control signal to control the state of said at least one switch and thereby control the power provided to at least one winding of said motor to control the resultant heat said winding produces.

13. The motor temperature control system of claim 12, further comprising a motor activity controller which provides a signal to a switch controller that indicates whether said motor is active.

14. The motor temperature control system of claim 13, wherein said motor is a torque motor having at least two windings, said torque motor responding to said at least one switch to superimpose phase quadrature heating currents on the torque producing motor currents.

* * * * *